US012707372B2

United States Patent
Hashmi et al.

(10) Patent No.: US 12,707,372 B2
(45) Date of Patent: Aug. 11, 2026

(54) SYSTEM AND METHOD TO MANAGE STORED NETWORK SLICE SELECTION ASSISTANCE INFORMATION

(71) Applicant: Samsung Electronics Co., Ltd., Suwon-si (KR)

(72) Inventors: Danish Ehsan Hashmi, Bangalore (IN); Lalith Kumar, Bangalore (IN); Koustav Roy, Bangalore (IN); Arijit Sen, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 17/813,552

(22) Filed: Jul. 19, 2022

(65) Prior Publication Data

US 2023/0015471 A1 Jan. 19, 2023

(30) Foreign Application Priority Data

Jul. 19, 2021 (IN) ............................ 202141032469
Jun. 20, 2022 (IN) ............................ 202141032469

(51) Int. Cl.
*H04W 48/08* (2009.01)
*H04W 48/02* (2009.01)
*H04W 48/16* (2009.01)
*H04W 60/00* (2009.01)
*H04W 84/04* (2009.01)

(52) U.S. Cl.
CPC ........... *H04W 48/08* (2013.01); *H04W 48/02* (2013.01); *H04W 48/16* (2013.01); *H04W 60/00* (2013.01); *H04W 84/042* (2013.01)

(58) Field of Classification Search
None
See application file for complete search history.

(56) References Cited

U.S. PATENT DOCUMENTS

2017/0126480 A1* 5/2017 Youtz .................... H04W 76/18
2019/0253935 A1* 8/2019 Huang-Fu ......... H04W 36/0016
2020/0236528 A1* 7/2020 Lee ....................... H04W 8/082
(Continued)

FOREIGN PATENT DOCUMENTS

WO 2021/085568 A1 5/2021
WO WO-2024035775 A1 * 2/2024 ........... H04W 48/18

OTHER PUBLICATIONS

"3rd Generation Partnership Project; Technical Specification Group Core Network and Terminals; Non-Access-Stratum (NAS) protocol for 5G System (5GS); Stage 3; (Release 17)", 3GPP TS 24.501 V17.3.1 (Jun. 2021), 825 pages.
(Continued)

*Primary Examiner* — Christopher T Wyllie

(57) ABSTRACT

The disclosure relates to a 5G or 6G communication system for supporting a higher data transmission rate. In some implementations, a user equipment (UE) and method to manage a rejected network slice selection assistance information (NSSAI) is disclosed. The method may include receiving, from a network, an activate default EPS bearer context request message with a Single-NSSAI (S-NSSAI) and a Public Land Mobile Network (PLMN) identifier (ID). In addition, the method may include removing the S-NSSAI from a rejected NSSAI list for a current PLMN.

12 Claims, 6 Drawing Sheets

(56) References Cited

U.S. PATENT DOCUMENTS

| | | | | |
|---|---|---|---|---|
| 2020/0322857 | A1* | 10/2020 | Park | H04W 76/22 |
| 2020/0359272 | A1* | 11/2020 | Huang-Fu | H04W 36/0033 |
| 2021/0099945 | A1* | 4/2021 | Watfa | H04W 48/18 |
| 2021/0360723 | A1* | 11/2021 | Takakura | H04W 48/18 |
| 2022/0232507 | A1* | 7/2022 | Kim | H04W 60/04 |
| 2022/0264294 | A1* | 8/2022 | Tamura | H04W 60/00 |
| 2022/0345885 | A1 | 10/2022 | Kuge | |
| 2022/0361080 | A1* | 11/2022 | Soliman | H04W 36/0033 |
| 2022/0369192 | A1* | 11/2022 | Huang-Fu | H04W 36/13 |
| 2022/0377693 | A1* | 11/2022 | Sugawara | H04W 76/10 |
| 2023/0015471 | A1* | 1/2023 | Hashmi | H04W 48/08 |
| 2023/0031697 | A1* | 2/2023 | Kumar | H04W 60/00 |
| 2023/0217365 | A1* | 7/2023 | Kumar | H04W 60/04 370/329 |
| 2023/0319696 | A1* | 10/2023 | Kuge | H04W 48/06 |
| 2023/0345353 | A1* | 10/2023 | Roy | H04W 60/04 |
| 2023/0397092 | A1* | 12/2023 | Kim | H04W 48/02 |
| 2024/0147235 | A1* | 5/2024 | Velev | H04L 63/10 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 17)", 3GPP TS 24.301 V17.3.0 (Jun. 2021), 563 pages.

Sharp, "UE behavior when the UE received the Allowed NSSAI", Change Request, 3GPP TSG-CT WG1 Meeting #130-e, May 20-28, 2021, C1-213859, 6 pages.

International Search Report dated Oct. 14, 2022 in connection with International Patent Application No. PCT/KR2022/010553, 3 pages.

Written Opinion of the International Searching Authority dated Oct. 14, 2022 in connection with International Patent Application No. PCT/KR2022/010553, 5 pages.

Examination report dated Apr. 13, 2023, in connection with Indian Application No. 202141032469, 5 pages.

Supplementary European Search Report dated Sep. 26, 2024, in connection with European Patent Application No. 22846203.2, 14 pages.

Samsung, et al., "Rejected S-NSSAI update," C1-214918 (was C1-214658), 3GPP TSG-CT WG1 Meeting #131-e, E-meeting, Aug. 19-27, 2021, 6 pages.

Sharp, "UE behavior when the UE receives the Allowed NSSAI," C1-213808, 3GPP TSG-CT WG1 Meeting #130-e, Electronic meeting, May 20-28, 2021, 6 pages.

* cited by examiner

SYSTEM AND METHOD TO MANAGE STORED NETWORK SLICE SELECTION ASSISTANCE INFORMATION

CROSS-REFERENCE TO RELATED APPLICATIONS

This application is based on and claims priority under 35 U.S.C. § 119 to Indian Patent Application No. 202141032469 filed Jul. 19, 2021 and Indian Patent Application No. 202141032469 filed on Jun. 20, 2022, in the Indian Intellectual Property Office, the disclosures of which are incorporated by reference herein in their entirety.

BACKGROUND

1. Field

The present disclosure generally relates to wireless communication system, and more specifically, relates to systems and methods to handle a stored network slice selection assistance information (NSSAI) in a user equipment (UE) while the UE is in the Evolved Packet Core (EPC) network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the ever-evolving requirement of data speed in mobile devices, the next-generation mobile communication systems need to support huge data traffic, an increase of data transmission rate per user, significantly increased number of connected mobile devices, and low latency. The 5$^{th}$ generation (5G) technology provides numerous such advantages including a concept of network slicing.

Specifically, the network slicing is a 5G concept which is used to realize dedicated connectivity services over network service provider networks. 5G introduces a Network Slice Selection Function (NSSF), which assists in selecting a network slice. 5G also introduces the concept of Network Slice Selection Assistance Information (NSSAI) to assist slice selection. The NSSAI consists of a list of Single NSSAIs (S-NSSAIs). A network, such as a Public Land Mobile Network (PLMN), combines different 5G core network elements to deliver much more flexible types of network slices (i.e., NSSAIs), and these network slices can be delivered in real time based on S-NSSAIs values provided in the N1 interface.

For a UE configured to connect to a 5GC and LTE PLMN networks, the UE may request for a slice/service from such networks. In an example where an NSSAI is rejected by the 5GC or more specifically, if the requested slice/service is unavailable due to one or more reasons, the UE is configured to store such rejected NSSAI(s) in a list. Due to the rejected NSSAI being stored at the UE, there are several issues that arise when the UE connects to the LTE PLMN. This is illustrated using the below figure.

FIG. 1 illustrates a flow diagram 100 depicting a user equipment (UE) receiving an S-NSSAI in an Activate Default Evolved Packet System (EPS) bearer, which is stored in a rejected NSSAI list in the UE, according to an existing technique. As depicted, when the UE 104 at step 108 receives the Single-Network Slice Selection Assistance Information (S-NSSAI) included in rejected NSSAI in one of the REGISTRATION ACCEPT message, the REGISTRATION REJECT message, the DEREGISTRATION REQUEST message or in the CONFIGURATION UPDATE COMMAND message from a 5G PLMN-A network 106, the UE 104 at step 110 stores the rejected S-NSSAI(s) into the rejected NSSAI list and the mapped S-NSSAI(s) for the rejected NSSAI based on one or more associated rejection cause(s). As is known in the existing mechanisms, the rejected S-NSSAI may be received in a Non-Access Stratum (NAS) message. The rejection causes may also be received along with the rejected S-NSSAI(s). The one or more rejection causes can be:

- S-NSSAI not available in the current PLMN or SNPN
- S-NSSAI not available in the current registration area
- S-NSSAI not available due to the failed or revoked network slice-specific authentication and authorization
- S-NSSAI not available due to maximum number of UEs reached.

The S-NSSAI is added to a respective list, hereafter referred to as a rejected NSSAI list.

Subsequently, at step 112, the UE may move to an LTE network (i.e., LTE PLMN-A) 102, and initiates a Packet Data Network (PDN) connection request at step 114. In response, at step 116, the LTE network 102 may send an EPS Session Management (ESM) message, for example, an Activate Default EPS Bearer Context Request message with S-NSSAI-A and PLMN-A in Protocol Configuration Options (PCO) information to the UE 104. In response to receipt of the ESM message at step 116, for example, Activate Default EPS Bearer Context Request message in LTE or in N1_MODE_INFORMATION for S-NSSAI and PLMN in PLMN ID N1_MODE_S_NSSAI_PLMN_ID in non-3GPP access connected to EPC (as per TS 24.302), if the rejected S-NSSAI and the PLMN ID that this S-NSSAI relates to are provided in the protocol configuration options IE or extended protocol configuration options IE, there are two possible issues:

a) The UE 104 may reject the Activate Default EPS Bearer Context Request as the corresponding NSSAI is rejected in that PLMN while the UE was on 5G, and b) The UE 104 might accept the Activate Default EPS Bearer Context Request, but session continuity to 5G during handover/reselection from LTE 102 to 5GC 106 is not guaranteed as the corresponding NSSAI for the PDN is stored in the rejected list in the UE 104. Since the corresponding NSSAI is stored in the rejected NSSAI list, the UE 104 will not request for that slice, and that PDN connection will be forced to be released, as that slice will not be received as part of the allowed NSSAI list.

c) The UE 104 will not be able to transfer PDN connection from non-3GPP connected to EPC (ePDG) to 5GC 106, if the S-NSSAI provided by the network during the PDN connection establishment via non-3GPP is in the rejected NSSAI list.

Further, another problem is related to updating the allowed NSSAI list on the Activate Default EPS bearer message. The UE 104 in LTE 102 may initiate a PDN connection request. Upon receipt of the Activate Default EPS Bearer Context Request message, if an S-NSSAI and the PLMN ID that this S-NSSAI relates to are provided in the protocol configuration options IE or extended protocol configuration options IE and the S-NSSAI is not a part of the allowed NSSAI, the UE 104 upon moving to 5G will never send that NSSAI in the requested NSSAI list. This might cause service discontinuity or non-usage of the provided slice in 5G, as the UE 104 will never include that slice in the requested slice IE.

Therefore, there is need for an improved handling of a stored network slice selection assistance information from the user equipment while connected on an Evolved Packet Core network.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

In one embodiment, a method of managing a rejected network slice selection assistance information (NSSAI) in a user equipment (UE) is disclosed. The method may include receiving, by the UE from a network, a Non-Access Stratum (NAS) message with a rejected Single-NSSAI (S-NSSAI) to be stored in a rejected NSSAI list. Further, the method may include determining, by the UE, that the rejected S-NSSAI is allowed for the UE when the UE is registered on an Evolved Packet System (EPS) network. Furthermore, the method may include updating, by the UE, the rejected NSSAI list in response to the determination. In addition, the method may include performing one or more UE actions based on the updating of the rejected NSSAI list.

In another embodiment, a system to manage a rejected network slice selection assistance information (NSSAI) in a user equipment (UE) is disclosed. The system may include one or more processors configured to: receive, by the UE from a network, a Non-Access Stratum (NAS) message with a rejected Single-NSSAI (S-NSSAI) to be stored in a rejected NSSAI list; determine, by the UE, that the rejected S-NSSAI is allowed for the UE when the UE is registered/registering on an Evolved Packet System (EPS) network; update, by the UE, the rejected NSSAI list in response to the determination; and perform one or more UE actions based on the updating of the rejected NSSAI list.

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
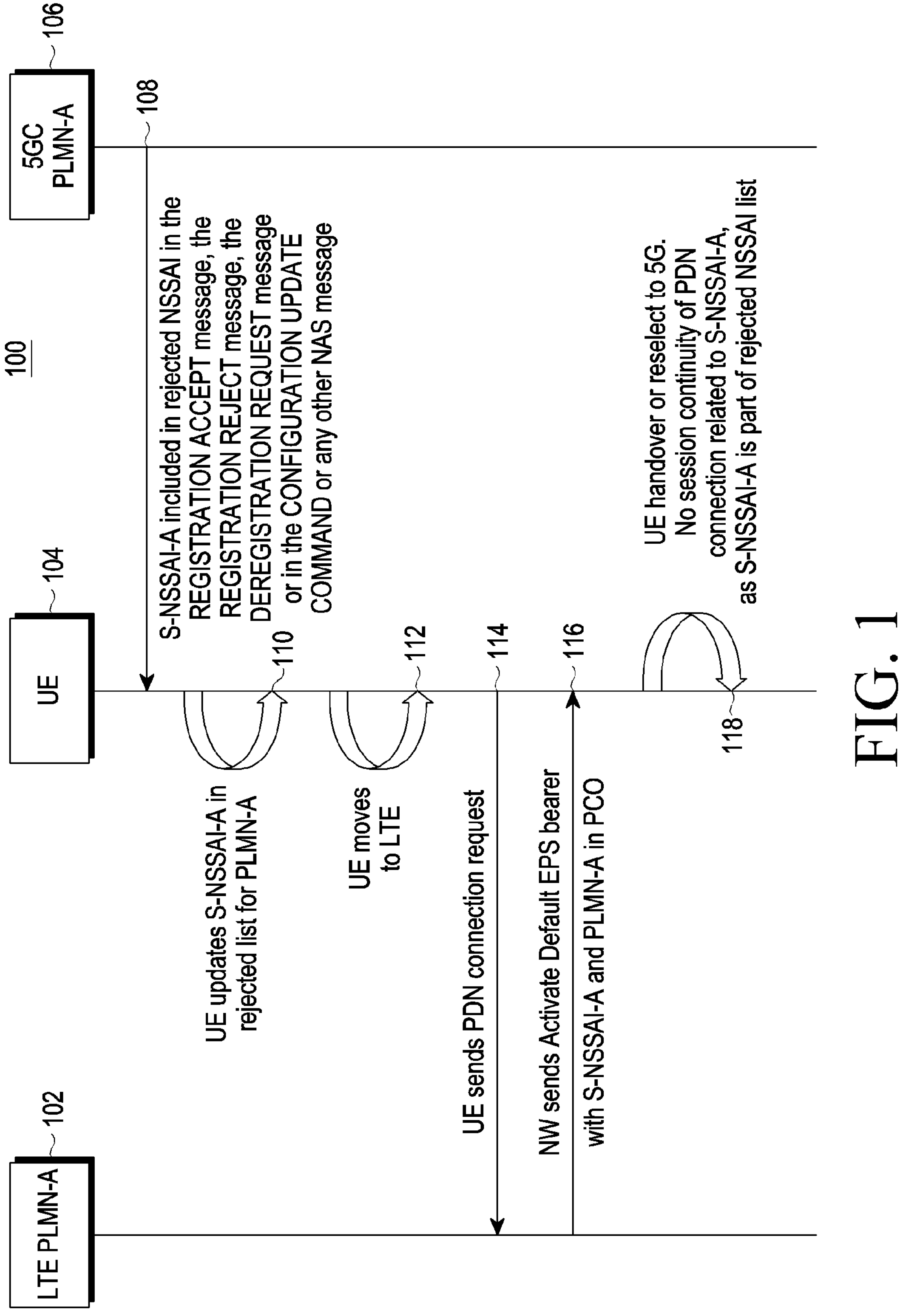
FIG. 1 illustrates a flow diagram depicting a user equipment (UE) receiving S-NSSAI in an Activate Default EPS Bearer which is stored in a rejected NSSAI list in the UE, according to an existing technique.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The present disclosure provides methods to handle Network Slice Selection Assistance Information (NSSAI) stored at a user equipment (UE) while registered/registering on an Evolved Packet Core (EPC) network.

In various embodiments of the present disclosure, the terms PCO and extended PCO are used interchangeably. Further, the S-NSSAI received as part of the PCO or ePCO in an ESM message like ACTIVATE DEFAULT EPS BEARER CONTEXT REQUEST message and S-NSSAI received in non-3GPP connected to EPC are used interchangeably.

Moreover, the requested NSSAI may mean requested NSSAI IE or Requested mapped NSSAI IE (or both).

Figure 2:
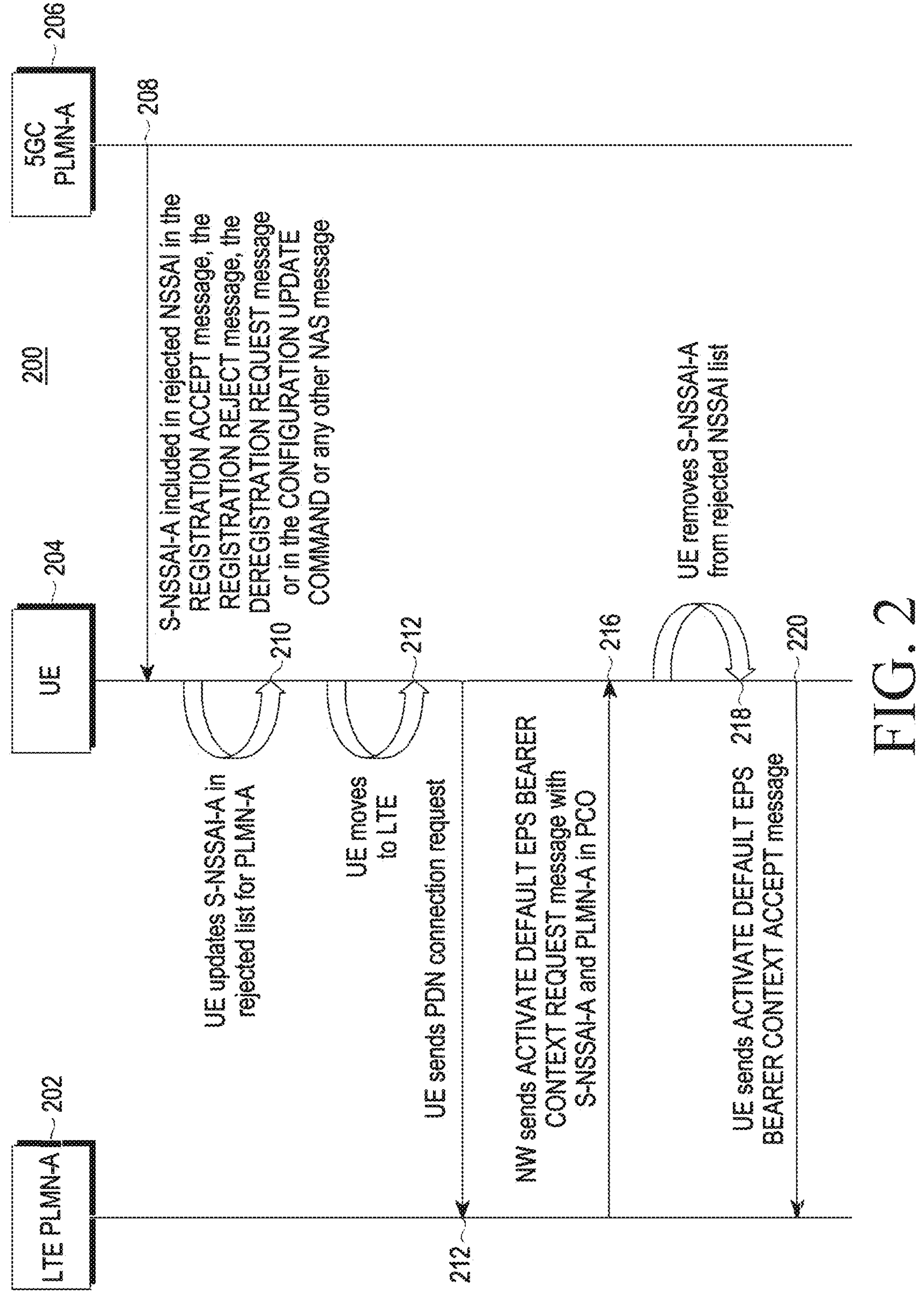
FIG. 2 illustrates a flow diagram depicting an exemplary embodiment of a UE updating a stored NSSAI list upon receiving NSSAI in an Activate Default EPS Bearer Context Request, in accordance with an embodiment of the present disclosure.

FIG. 2 illustrates a flow diagram 200 depicting an exemplary embodiment of a UE updating a stored NSSAI list upon receiving NSSAI in an Activate Default EPS Bearer Context Request, in accordance with an embodiment of the present disclosure. As depicted, the flow diagram 200 includes an LTE PLMN-A 202, a UE 204, and a 5GC PLMN-A 206. The UE 204 may be configured to connect with the LTE PLMN-A 202 and the 5GC PLMN-A 206. The UE 204 may include, but not limited to, a mobile phone, a smart watch, a tablet, and any other electronic device which can connect to a 4G and/or 5G network, such as, LTE PLMN-A 202 and the 5GC PLMN-A 206. Further, the depicted LTE PLMN-A 202 and the 5GC PLMN-A 206 may include one or more network entities of 4G and 5G network, respectively. For example, the LTE PLMN-A 202 may include, but not limited to, a Mobility Management Function (MME). Similarly, the 5GC PLMN-A 206 may include, but not limited to, an Access and Mobility Function (AMF), a Session Management Function (SMF), etc.

In an embodiment, when the UE 204, at step 208, receives the S-NSSAI(s) included in the rejected NSSAI in one of the REGISTRATION ACCEPT message, the REGISTRATION REJECT message, the DEREGISTRATION REQUEST message or in the CONFIGURATION UPDATE COMMAND message or any other Non-Access Stratum (NAS) message, the UE 204, at step 210 stores such rejected S-NSSAI(s) into the rejected NSSAI and the mapped S-NSSAI(s) for the rejected NSSAI based on the associated rejection cause(s) which are received along with the NAS message. In one embodiment, at step 208, a back-off timer may also be received along with the NAS message which may be associated with a predefined time duration for which the rejected S-NSSAI is maintained in the rejected NSSAI list. The back-off timer may be initiated upon its receipt in the NAS message and continues to run till the predefined time duration, or alternatively, till one or more conditions of removal of rejected S-NSSAI(s) are satisfied, as discussed hereinafter.

Now, the UE 204, at step 212, may move to the LTE network (i.e., there is an intersystem change) and initiate a Packet Data Network (PDN) connection request at step 214. At step 216, the LTE PLMN-A 202 network may send the ACTIVATE DEFAULT EPS BEARER CONTEXT REQUEST message. Upon receipt of the ACTIVATE DEFAULT EPS BEARER CONTEXT REQUEST message, if one of the S-NSSAI or the PLMN ID that this S-NSSAI relates to are provided in the Protocol Configuration Options (PCO) Information Element (IE) or the Extended PCO IE, the UE 204, at step 218, may remove the S-NSSAI from the rejected NSSAI list optionally for the corresponding PLMN or equivalent PLMN to ensure service in LTE and service continuity while moving back to the 5GC PLMN-A 206. The Rejected NSSAI list may include at least one of the below:

S-NSSAI not available in the current PLMN or SNPN,

S-NSSAI not available in the current registration area,

S-NSSAI not available due to the failed or revoked network slice-specific authentication and authorization, S-NSSAI not available due to maximum number of UEs reached.

At step 220, the UE 204 may send ACTIVATE DEFAULT EPS BEARE CONTEXT ACCEPT message to the LTE network Further, the back-off timer received along with reject cause "S-NSSAI not available due to maximum number of UEs reached" is continued at the UE 204 for an associated predefined duration when the S-NSSAI which is part of the Rejected NSSAI list is received as part of the PCO or ePCO in the ESM message like the ACTIVATE DEFAULT EPS BEARER CONTEXT REQUEST message.

In yet another embodiment, the back-off timer received along with the reject cause "S-NSSAI not available due to maximum number of UEs reached" is stopped at the UE 204 when the S-NSSAI which is part of the Rejected NSSAI list is received as part of the PCO or ePCO in the ESM message like the ACTIVATE DEFAULT EPS BEARER CONTEXT REQUEST message.

Figure 3:
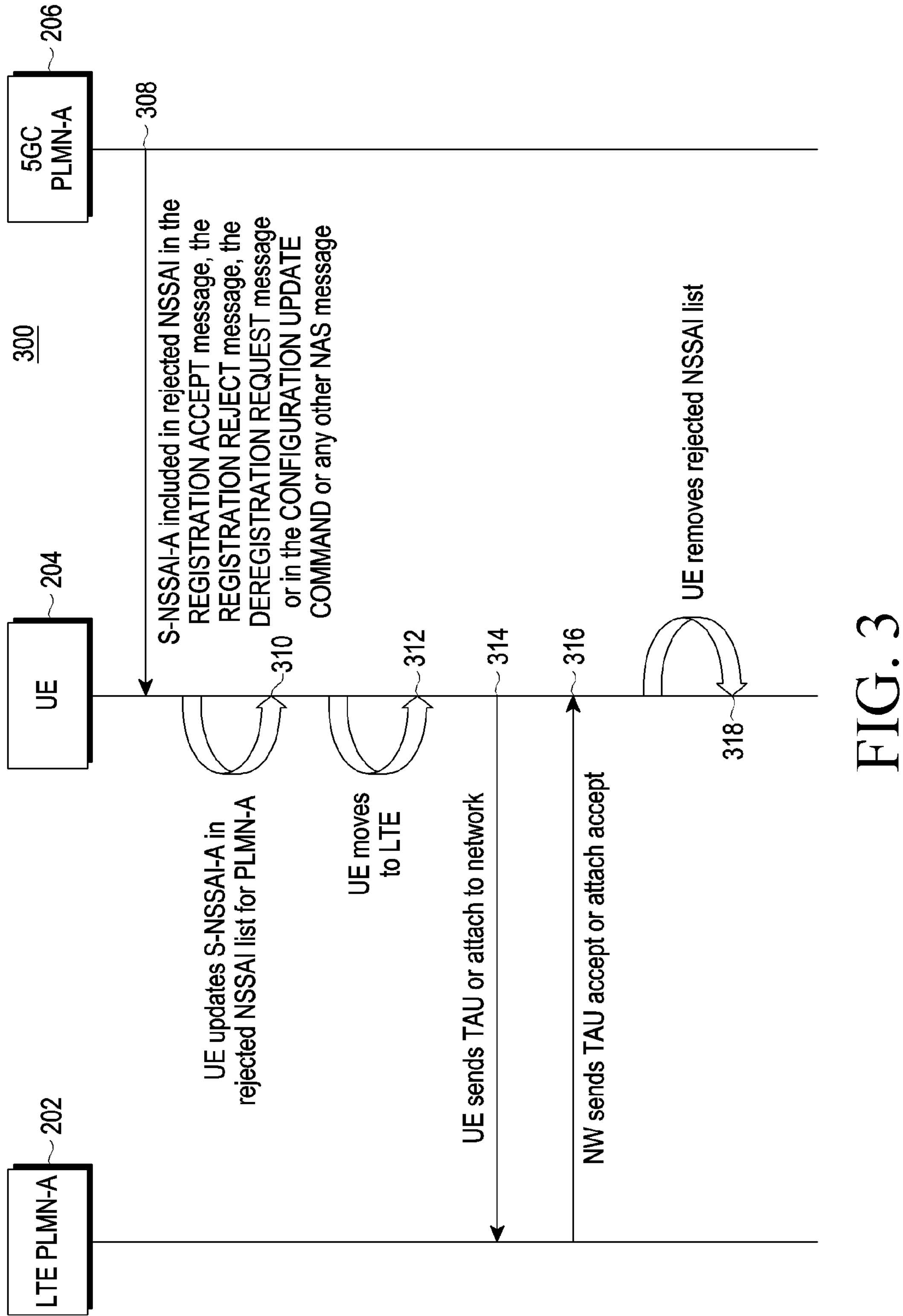
FIG. 3 illustrates a flow diagram depicting an exemplary embodiment of a UE updating a stored NSSAI list upon leaving 5GS network, in accordance with an embodiment of the present disclosure.

FIG. 3 illustrates a flow diagram 300 depicting an exemplary embodiment of a UE updating a stored NSSAI list upon leaving a 5GS network, in accordance with an embodiment of the present disclosure. In an embodiment, when the UE 204, at step 308, receives the S-NSSAI(s) included in the rejected NSSAI in one of the REGISTRATION ACCEPT message, the REGISTRATION REJECT message, the DEREGISTRATION REQUEST message, the CONFIGURATION UPDATE COMMAND message, or in any other NAS message, the UE 204, at step 310 may be configured to store the rejected S-NSSAI(s) into the rejected NSSAI list and the mapped S-NSSAI(s) for the rejected NSSAI based on the associated rejection cause(s) which are received along with the NAS message.

In one embodiment, a back-off timer may also be received along with the NAS message at step 308 which may be associated with a predefined time duration for which the rejected S-NSSAI is maintained in the rejected NSSAI list. The back-off timer may be initiated upon its receipt in the NAS message and continues to run till the predefined time duration, or alternatively, till one or more conditions of removal of rejected S-NSSAI(s) are satisfied, as discussed hereinafter.

Now, the UE 204 at step 312 may move to the LTE PLMN-A 202, and at step 314, may send a Tracking Area Update (TAU) command or an attach request to the network 202. In one embodiment, the UE 204 may delete the complete rejected NSSAI list optionally at step 318, when the TAU/Attach procedure is successfully completed in LTE at step 316.

In one embodiment, the back-off timer received along with the reject cause "S-NSSAI not available due to maximum number of UEs reached" continues to run when the UE 204 performs intersystem change from N1 mode to S1 mode and vice versa. The back-off timer received along with the reject cause "S-NSSAI not available due to maximum number of UEs reached" may be stopped when the UE 204 performs an intersystem change from N1 mode to S1 mode and vice versa.

Figure 4:
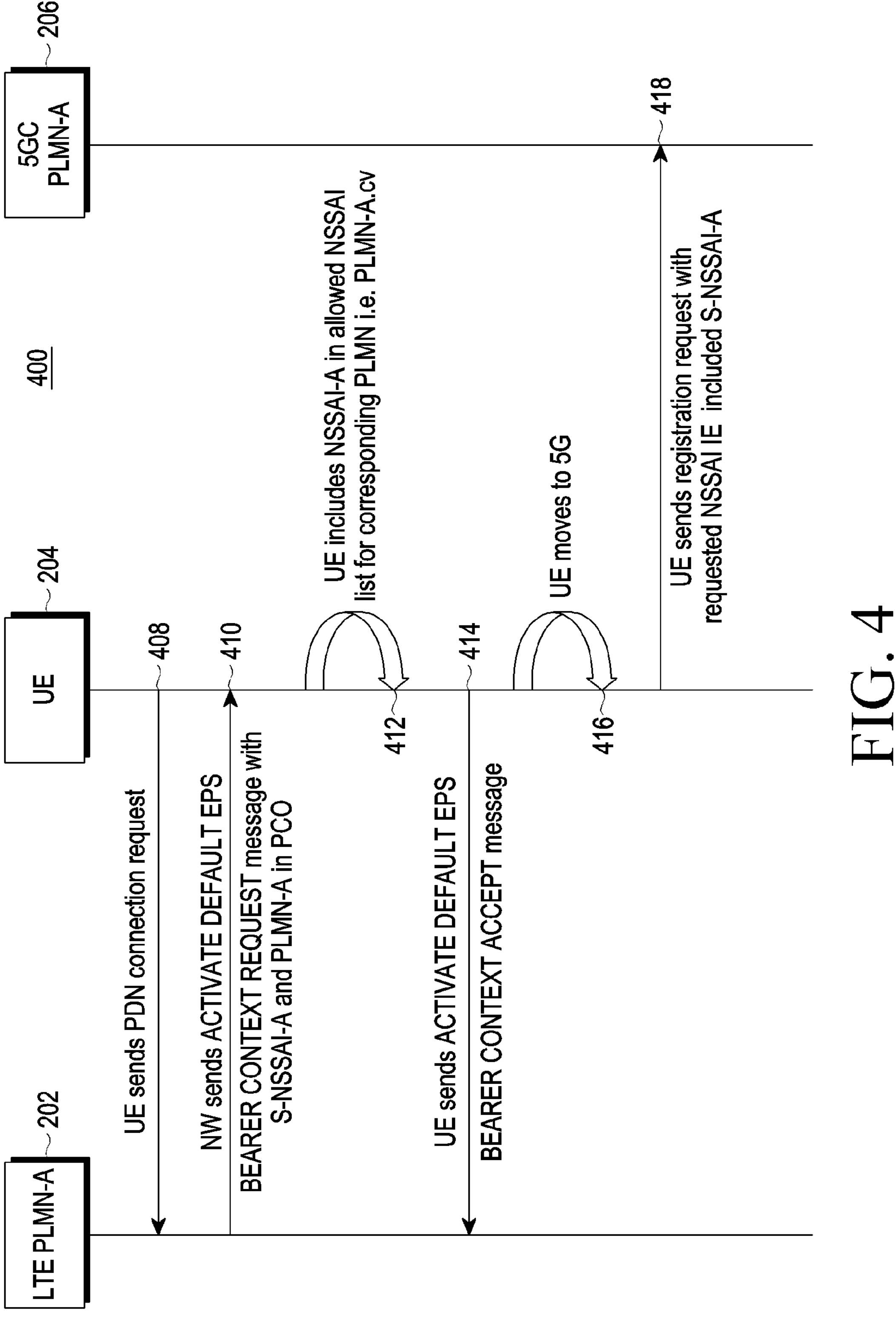
FIG. 4 illustrates a flow diagram depicting an exemplary embodiment of UE updating a stored NSSAI list upon receiving NSSAI in Activate Default EPS Bearer Request, in accordance with an embodiment of the present disclosure.

FIG. 4 illustrates a flow diagram 400 depicting an exemplary embodiment of the UE updating a stored NSSAI list upon receiving the S-NSSAI in the Activate Default EPS Bearer Request, in accordance with an embodiment of the present disclosure. In an embodiment, at step 408, the UE may send a PDN request to the LTE PLMN-A 202 network. At step 410, upon receipt of the ACTIVATE DEFAULT EPS BEARER CONTEXT REQUEST message, if an S-NSSAI and the PLMN ID that this S-NSSAI relates to are provided in the Protocol Configuration Options (PCO) IE or the extended Protocol Configuration Options (ePCO) IE and the S-NSSAI is not a part of allowed NSSAI, the UE 204, at step 412, may include the NSSAI in the stored allowed NSSAI list, if the NSSAI is not yet included in the allowed list. This will ensure the service continuity or usage of the network slice while the UE 204 is on the 5GC PLMN-A 206 network. Including these NSSAIs in the allowed list will ensure that the UE 204 will include these slices in requested Slice IE in NAS message while in 5G network.

At step 414, the UE 204 may send an ACTIVATE DEFAULT EPS BEARER CONTEXT ACCEPT message. At step 416, the UE 204 may move to the 5GC 206, and at step 418, the UE 204 may send a registration request with the requested NSSAI IE included S-NSSAI-A.

Accordingly, the UE 204 may be configured to include one or more S-NSSAI received in EPS as part of the ESM message in the requested NSSAI even though those are part of the rejected NSSAI list. Specifically, the requested NSSAI IE (or requested mapped NSSAI IE) includes S-NSSAI(s), and if available, the associated mapped S-NSSAI(s) for each PDN connection that is established in the S1 mode, when the UE 204 is operating in the single-registration mode and the UE 204 is performing an inter-system change from the S1 mode to the N1 mode while performing a mobility registration update procedure in 5GS even though those are part of the Rejected NSSAI list.

In yet another embodiment, the UE 204 may not include one or more S-NSSAI received in EPS as part of the ESM message in the requested NSSAI, if those are part of the Rejected NSSAI list. Specifically, the requested NSSAI IE does not include S-NSSAI(s), and if available, the associated mapped S-NSSAI(s) for each PDN connection that is established in the S1 mode when the UE is operating in the single-registration mode and the UE is performing an inter-system change from the S1 mode to the N1 mode while performing the mobility registration update procedure in 5GS if those are part of the Rejected NSSAI list. For example, the NSSAI is in the rejected NSSAI list due to "S-NSSAI not available due to maximum number of UEs reached" and optionally, the associated back-off timer is running for that S-NSSAI. The UE may locally release the associated PDU sessions.

Further, as per conventional techniques, if the rejected NSSAI is added, e.g., S-NSSAI-A added to the rejected list due to reject cause "S-NSSAI not available due to maximum number of UEs reached", and the UE 204 performs intersystem change to the S1 mode and even though the S-NSSAI-A is received as part of the ESM message like ACTIVATE DEFAULT EPS BEARER CONTEXT REQUEST message in the PCO or ePCO, the UE 204 does not remove the NSSAI-A from the Rejected NSSAI list. The UE 204 may be informed in a registration accept message or UE configuration update message (as a part of an NAS signalling message) whether a network slice admission control is applicable only for 5GS or both for 5GS and EPS.

If an indication is received that it's applicable only for 5GS then:

a) If the rejected NSSAI is added in the rejection list, e.g., NSSAI-A due to reject cause "S-NSSAI not available due to maximum number of UEs reached" and the UE performs intersystem change to the S1 mode and even though the NSSAI-A is received as part of the ESM message like ACTIVATE DEFAULT EPS BEARER CONTEXT REQUEST message in the PCO or ePCO, the UE will not remove the NSSAI-A from the Rejected NSSAI list.
b) The UE will not include one of more S-NSSAI received in the EPS as part of the ESM message in the requested NSSAI if those are part of the rejected NSSAI list. Specifically, the requested NSSAI IE will not include S-NSSAI(s), and if available, the associated mapped S-NSSAI(s) for each PDN connection that is established in the S1 mode when the UE is operating in the single-registration mode and the UE is performing an inter-system change from the S1 mode to the N1 mode while performing the mobility registration update procedure in 5GS, if those are part of the rejected NSSAI list.
c) The back-off timer received along with reject cause "S-NSSAI not available due to maximum number of UEs reached" continues to run when the UE performs intersystem change from the N1 mode to the S1 mode and vice versa.

If an indication is received that it's applicable both for 5GS and EPS, then:

a) If the Rejected NSSAI is added in the rejection list, e.g., NSSAI-A due to reject cause "S-NSSAI not available due to maximum number of UEs reached" and the UE performs intersystem change to the S1 mode and even though NSSAI-A is received as part of the ESM message like ACTIVATE DEFAULT EPS BEARER CONTEXT REQUEST message in the PCO or ePCO, the UE removes the S-NSSAI-A from Rejected NSSAI list.
b) The UE will include one of more S-NSSAI received in the EPS as part of the ESM message in the requested NSSAI even though those are part of the Rejected NSSAI list. Specifically, the requested NSSAI IE includes S-NSSAI(s), and if available, the associated mapped S-NSSAI(s) for each PDN connection that is established in the S1 mode when the UE is operating in the single-registration mode and the UE is performing an inter-system change from the S1 mode to the N1 mode while performing the mobility registration update procedure in 5GS even though those are part of the Rejected NSSAI list.
c) The back-off timer received along with reject cause "S-NSSAI not available due to maximum number of UEs reached" is stopped when the UE performs intersystem change from the N1 mode to the S1 mode and vice versa.

In an embodiment, the UE includes S-NSSAI for each PDN connection that is established in the S1 mode, even if corresponding S-NSSAI is in the rejected NSSAI for the current PLMN or in the rejected NSSAI for the current registration area or in the rejected NSSAI for the failed or revoked NSSAA or in the rejected NSSAI for the maximum number of UEs reached or in the pending NSSAI.

When the UE receives the ACTIVATE DEFAULT EPS BEARER CONTEXT REQUEST message provided with the S-NSSAI and the PLMN ID in the protocol configuration options IE or extended protocol configuration options IE (see subclause 6.2.2 of 3GPP TS 24.301 [15]) or the S-NSSAI and PLMN ID is provided in non-3GPP access connected to the EPC, the UE removes the S-NSSAI from the rejected NSSAI for the PLMN and the rejected NSSAI for the failed or revoked NSSAA.

Further, the UE includes in the requested NSSAI list, S-NSSAI for each PDN connection that is established in the S1 mode or non-3GPP access connected to EPC even if corresponding S-NSSAI is in the rejected NSSAI for the current PLMN or in the rejected NSSAI for the current registration area or in the rejected NSSAI for the failed or revoked NSSAA or in the rejected NSSAI for the maximum number of UEs reached or in the pending NSSAI.

In an embodiment, the UE includes in the requested NSSAI list, S-NSSAI for each PDN connection that is established in the S1 mode or non-3GPP access connected to the EPC even if corresponding S-NSSAI is in the rejected NSSAI for the current PLMN or in the rejected NSSAI for the current registration area or in the rejected NSSAI for the failed or revoked NSSAA or in the rejected NSSAI for the maximum number of UEs reached or in the pending NSSAI. If the back-off timer is running, the UE stops the timer for the corresponding S-NSSAI.

In a further embodiment, the UE includes in the requested NSSAI list, the S-NSSAI of PDN connection established in non-3GPP access connected to EPC (non-3GPP network provide S-NSSAI in N1_MODE_INFORMATION and PLMN in PLMN ID N1_MODE_S_NSSAI_PLMN_ID in IKEv2payload defined in 3GPP TS 24.302) even if corresponding S-NSSAI is in the rejected NSSAI for the current PLMN or in the rejected NSSAI for the current registration area or in the rejected NSSAI for the failed or revoked NSSAA or in the rejected NSSAI for the maximum number of UEs reached or in the pending NSSAI. If the back-off timer is running, the UE stops the timer for the corresponding S-NSSAI.

In still another embodiment, the UE includes in the requested NSSAI list, the S-NSSAI of PDN connection established in non-3GPP access connected to EPC (non-3GPP network provide S-NSSAI in N1_MODE_INFORMATION and PLMN in PLMN ID N1_MODES_NSSAI_PLMN_ID in IKEv2payload defined in 3GPP TS 24.302), if the UE decides to Handover the corresponding PDN connection from non-3GPP connected to EPC to 5GC even if corresponding S-NSSAI is in the rejected NSSAI for the current PLMN or in the rejected NSSAI for the current registration area or in the rejected NSSAI for the failed or revoked NSSAA or in the rejected NSSAI for the maximum number of UEs reached or in the pending NSSAI at the time the UE decided to Handover PDN connection to 5GC. If the back-off timer is running, the UE stops the timer for the corresponding S-NSSAI.

In yet another embodiment, the UE includes in the requested NSSAI list, the S-NSSAI of PDN connection established in non-3GPP access connected to EPC (non-3GPP network provide S-NSSAI in N1_MODE_INFORMATION and PLMN in PLMN ID N1_MODE_S_NSSAI_PLMN_ID in IKEv2payload as defined in 3GPP TS 24.302) if the UE decides to Handover the corresponding PDN connection from non-3GPP connected to EPC to 5GC even if corresponding S-NSSAI is in the rejected NSSAI for the current PLMN or in the rejected NSSAI for the current registration area or in the rejected NSSAI for the failed or revoked NSSAA or in the rejected NSSAI for the maximum number of UEs reached or in the pending NSSAI at the time of UE decided to Handover PDN connection to 5GC. If the back-off timer is running, the UE stops the timer for the corresponding S-NSSAI.

In yet another embodiment, the UE deletes the S-NSSAI of PDN connection established in non-3GPP access connected to EPC (non-3GPP network provide S-NSSAI in N1_MODE_INFORMATION and PLMN in PLMN ID N1_MODE_S_NSSAI_PLMN_ID in IKEv2payload) from the rejected NSSAI list. If the back-off timer is running for an S-NSSAI, the UE stops the timer for the corresponding S-NSSAI.

Further, if the UE performs an inter-system change from the N1 mode to the S1 mode and the UE successfully completes the tracking area update (TAU) procedure and the UE is not registered with the current PLMN over another access, the rejected NSSAI for the current PLMN and the rejected NSSAI for the failed or revoked NSSAA are deleted. Additionally, if the UE performs an inter-system change from the N1 mode to the S1 mode and the UE successfully completes the TAU procedure, the rejected NSSAI for the current registration area corresponding to the access type is deleted. When the UE receives the ACTIVATE DEFAULT EPS BEARER CONTEXT REQUEST message provided with the S-NSSAI and the PLMN ID in the protocol configuration options IE or extended protocol configuration options IE, the UE removes the S-NSSAI from the rejected NSSAI for the current PLMN.

Figure 5:
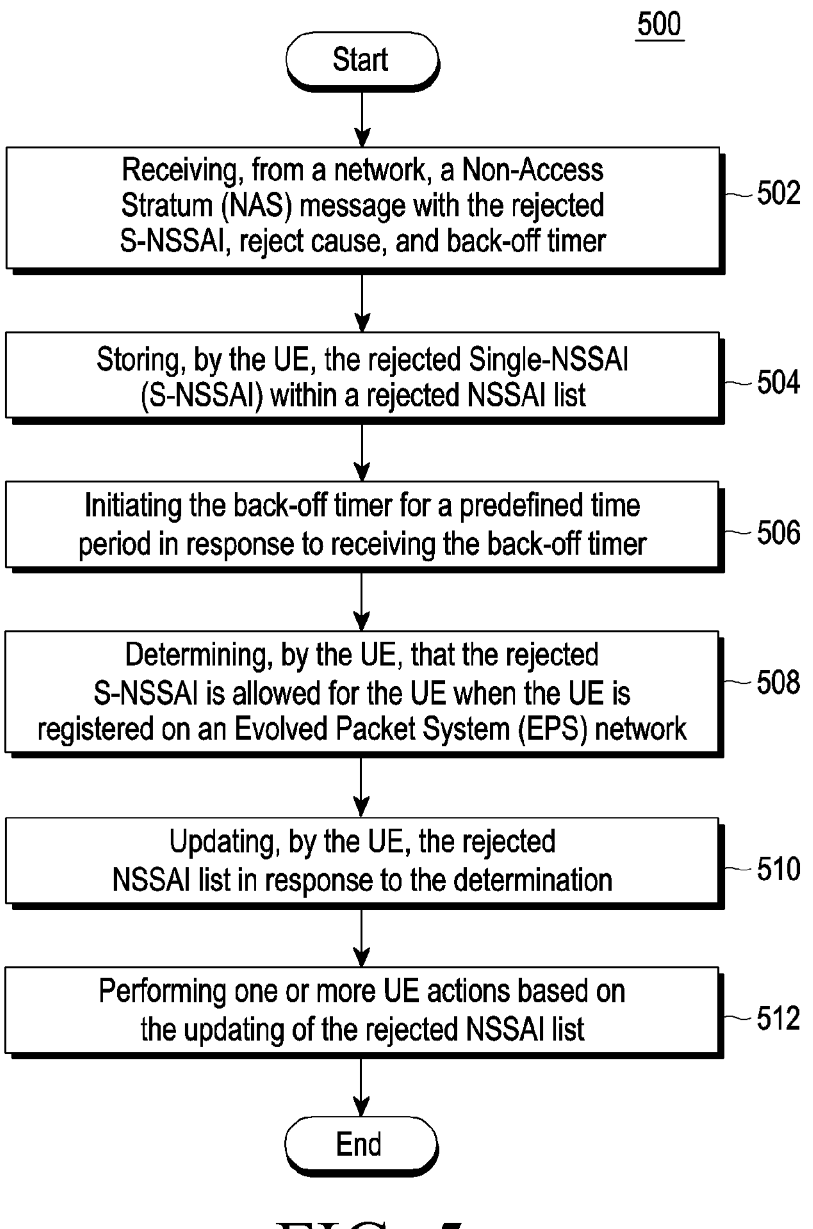
FIG. 5 illustrates a process flow depicting a method of managing a rejected network slice selection assistance information (NSSAI) in a user equipment (UE), according to an embodiment of the present disclosure.

FIG. 5 illustrates a process flow depicting a method 500 of managing a rejected network slice selection assistance information (NSSAI) in a user equipment (UE), according to an embodiment of the present disclosure.

At step 502, the method 500 includes receiving, from a network, a Non-Access Stratum (NAS) message with the rejected S-NSSAI, reject cause, and back-off timer. In an embodiment of the present disclosure, the NAS message comprises a reject cause indicating that the rejected S-NSSAI is unavailable, and wherein the reject cause is at least one of the S-NSSAI not available in the current PLMN or SNPN, the S-NSSAI not available in the current registration area, the S-NSSAI not available due to the failed or revoked network slice-specific authentication and authorization, or the S-NSSAI not available due to maximum number of UEs reached.

At step 504, the method 500 includes storing, by the UE, the rejected Single-NSSAI (S-NSSAI) within a rejected NSSAI list. In an embodiment of the present disclosure, the rejected NSSAI list includes at least one of a rejected NSSAI for the current PLMN or SNPN, a rejected NSSAI for the current registration area, a rejected NSSAI for the failed or revoked NSSAI, or a rejected NSSAI for the maximum number of UEs reached.

At step 506, the method 500 includes initiating the back-off timer (e.g., timer T3526, as defined in TS 24.501 v17.4) for a predefined time period in response to receiving the back-off timer. In an alternative embodiment, the back-off timer continues to run till a condition for removal of the S-NSSAI from the rejected list is satisfied, as discussed throughout this specification.

At step 508, the method 500 includes determining, by the UE, that the rejected S-NSSAI is allowed for the UE when the UE is registered/registering on an Evolved Packet System (EPS) network (e.g., LTE PLMN-A network).

At step 510, the method 500 includes updating, by the UE, the rejected NSSAI list in response to the determination. In an embodiment of the present disclosure, the updating of the rejected NSSAI list may include deleting the complete rejected NSSAI list in response to a successful completion of a Tracking Area Update (TAU) or attach procedure after an intersystem change from the N1 mode to the S1 mode of the UE. Further, in another embodiment, the updating of the rejected NSSAI list may include removing, by the UE, the rejected S-NSSAI from the rejected NSSAI list in response to receiving an activate default EPS bearer context request including at least one of the S-NSSAI which is part of the rejected NSSAI list in the UE and a current registered PLMN ID or an equivalent PLMN ID.

At step 512, the method 500 includes performing one or more UE actions based on the updating of the rejected NSSAI list. In an embodiment of the present disclosure, the one or more UE actions may include stopping, by the UE, the back-off timer (e.g., T3526) in response to one of removing the rejected S-NSSAI from the rejected NSSAI list, or receiving an activate default EPS bearer context request including the S-NSSAI which is part of rejected NSSAI list in the UE and a PLMN ID. In an embodiment of the present disclosure, the one or more UE actions may include continuing, by the UE, to run the back-off timer in response to an intersystem change from the N1 mode to the S1 mode of the UE.

Figure 6:
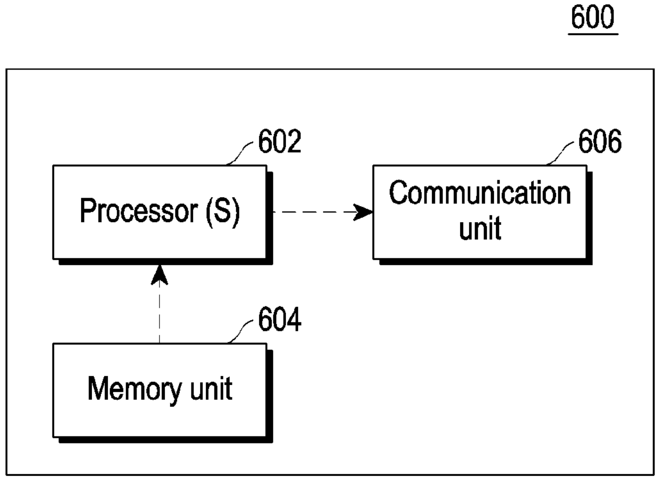
FIG. 6 illustrates an exemplary diagram of a network node, according to an embodiment of the present disclosure.

FIG. 6 illustrates an exemplary diagram of a network node 600, according to an embodiment of the present disclosure. The network node 600 may correspond to 5GC PLMN-A and/or LTE PLMN-A, as discussed throughout this disclosure. The network node 600 may include at least one processor 602, a memory unit 604 (e.g., storage), and a communication unit 606 (e.g., communicator, communication interface, or transceiver). Further, the network node 600 may also include the Cloud-RAN (C-RAN), a Central Unit (CU), a core Network (NW), a Distributed unit (DU) or the any other possible network (NW) entity of the LTE PLMN-A or the 5GC PLMN-A. The communication unit 606 may perform one or more functions for transmitting and receiving signals via a wireless channel.

As an example, the processor 602 may be a single processing unit or a number of units, all of which could include multiple computing units. The processor 602 may be implemented as one or more microprocessors, microcomputers, microcontrollers, digital signal processors, central processing units, state machines, logic circuitries, and/or any devices that manipulate signals based on operational instructions. Among other capabilities, the processor 602 is configured to fetch and execute computer-readable instructions and data stored in the memory. The processor 602 may include one or a plurality of processors. At this time, one or a plurality of processors 602 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 602 may control the processing of the input data in accordance with a predefined operating rule or artificial intelligence (AI) model stored in the non-volatile memory and the volatile memory, i.e., memory unit 604. The predefined operating rule or artificial intelligence model is provided through training or learning.

The memory 604 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 7:
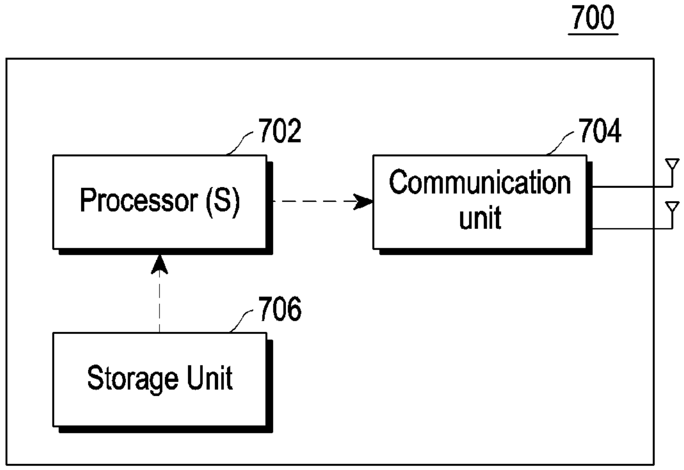
FIG. 7 illustrates a diagram of the configuration of a user equipment in a wireless communication system, according to an embodiment of the present disclosure; and Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

FIG. 7 illustrates a diagram of the configuration of a user equipment (UE) 700 in a wireless communication system, according to an embodiment of the present disclosure. The configuration of FIG. 7 may be understood as a part of the configuration of the UE 700. Hereinafter, it is understood that terms including "unit" or "module" at the end may refer to the unit for processing at least one function or operation and may be implemented in hardware, software, or a combination of hardware and software.

Referring to FIG. 7, the UE 700 may include at least one processor 702, a communication unit 704 (e.g., communicator, communication interface, or transceiver), and a storage unit 706 (e.g., storage). By way of example, the UE 700 may be a User Equipment, such as a cellular phone or other device that communicates over a plurality of cellular networks (such as a 3G, 4G, a 5G or pre-5G, 6G network or any future wireless communication network). The communication unit 704 may perform functions for transmitting and receiving signals via a wireless channel.

As an example, the processor 702 may be a single processing unit or a number of units, all of which could include multiple computing units. The processor 702 may be implemented as one or more microprocessors, microcomputers, microcontrollers, digital signal processors, central processing units, state machines, logic circuitries, and/or any devices that manipulate signals based on operational instructions. Among other capabilities, the processor 702 is configured to fetch and execute computer-readable instructions and data stored in the memory. The processor 702 may include one or a plurality of processors. At this time, one or a plurality of processors 702 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 702 may control the processing of the input data in accordance with a predefined operating rule or artificial intelligence (AI) model stored in the non-volatile memory and the volatile memory, i.e., memory unit 704. The predefined operating rule or artificial intelligence model is provided through training or learning.

The memory 704 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Further, the solutions proposed herein can be used in any order and in any combination. Unless otherwise defined, all technical and scientific terms used herein have the same meaning as commonly understood by one of ordinary skilled in the art to which this disclosure belongs. The system, methods, and examples provided herein are illustrative only and not intended to be limiting.

In an embodiment of this disclosure, A method performed by a user equipment (UE) in a wireless communication, the method comprising: receiving, from a network, an activate default EPS bearer context request message with a Single-network slice selection assistance information (S-NSSAI)

and a public land mobile network (PLMN) identifier (ID); removing the S-NSSAI from a rejected NSSAI list for a current PLMN.

In addition, wherein the rejected NSSAI list includes at least one of a rejected NSSAI for the current PLMN, a rejected NSSAI for a current registration area, a rejected NSSAI for a failed or revoked NSSAI, or a rejected NSSAI for a maximum number of UEs reached.

In addition, wherein the S-NSSAI is mapped for the rejected NSSAI list based on a reject cause indicating that the S-NSSAI is unavailable, and wherein the reject cause is at least one of the S-NSSAI not available in the current PLMN, the S-NSSAI not available in a current registration area, the S-NSSAI not available due to a failed or revoked network slice-specific authentication and authorization, or the S-NSSAI not available due to a maximum number of UEs reached.

In addition, the method comprising deleting the rejected NSSAI list in response to a successful completion of a Tracking Area Update (TAU) or attach procedure after an intersystem change from N1 mode to S1 mode of the UE.

In addition, the method comprising stopping a back-off timer in response to removing the S-NSSAI from the rejected NSSAI list for the maximum number of UEs reached.

In addition, the method comprising continuing to run a back-off timer in response to an intersystem change from N1 mode to S1 mode of the UE.

In addition, the method comprising receiving, from another network, the S-NSSAI to be stored in the rejected NSSAI list included in a second NAS message.

In addition, wherein the second NAS message is one of: REGISTRATION ACCEPT message, REGISTRATION REJECT message, DEREGISTRATION REQUEST message, or CONFIGURATION UPDATE COMMAND message.

In addition, the method comprising updating the S-NSSAI in the rejected NSSAI list in response to receiving the second NAS message.

In addition, wherein a back off timer is received with the second NAS message, and wherein the back off timer is initiated for a predefined time period.

When UE receive NAS message including rejected NSSAI, the corresponding NSSAI is added to the rejected NSSAI.

Rejected NSSAI can be S-NSSAI not available in the current PLMN or SNPN, S-NSSAI not available in the current registration area, S-NSSAI not available due to the failed or revoked network slice-specific authentication and authorization, S-NSSAI not available due to maximum number of UEs reached UE can receive rejected NSSAI in the REGISTRATION ACCEPT, REGISTRATION REJECT, DEREGISTRATION REQUEST or CONFIGURATION UPDATE COMMAND message UE doesn't try to obtain service on the S-NSSAI which are part of the rejected NSSAI (i.e UE doesn't include S-NSSAI from rejected NSSAI in the requested NSSAI)

When UE performs intersystem change, In EPC (4G) area, P-GW can send S-NSSAI in PCO as a part of the ACTIVATE DEFAULT EPS BEARER CONTEXT REQUEST.

At the time of handover from EPC to 5G, if S-NSSAI of the PDN connection is in rejected NSSAI, UE will not be able to continue session as UE will see that S-NSSAI is not allowed and will not request it in the requested NSSAI in the rejected message.

As per prior art when UE initiate registration procedure in 5GS, it try to obtain service on the S-NSSAI(s) which not in the rejected NSSAI However prior art misses the cases wherein UE's subscription may change when UE is in the EPC network, given UE is in EPS (4GS) network and is not allowed to update its status of 5GS when UE goes back to 5GS it will not continue to ask for the services on the rejected slices which were actually allowed for the UE Thus UE will miss on the services and there will be no session continuity for the UEs when UE moves from EPS to 5GS.

Thus its desirable to handle Rejected NSSAI concepts which will be used in 5GS when UE is in the 4GS network.

In an embodiment of this disclosure, the method utilize the received S-NSSAI in the PCO of the ACTIVATE DEFAULT EPS BEARER CONTEXT REQUEST (in 4G) to determine if session can continue in the 5GS as following:

If UE receive S-NSSAI in the PCO of the ACTIVATE DEFAULT EPS BEARER CONTEXT REQUEST in EPC network, it check if the corresponding S-NSSAI is in the rejected NSSAI, If S-NSSAI is present in the rejected NSSAI, it delete the S-NSSAI from rejected NSSAI, If back off time for the S-NSSAI were running, UE additionally stop the associated back off timer.

In an embodiment of this disclosure, When UE moves to LTE and sends Tracking area Update command to network. UE may delete complete rejected S-NSSAI list when TAU/Attach is successfully completed.

In an embodiment of this disclosure, The back-off timer received along with reject cause "S-NSSAI not available due to maximum number of UEs reached" is continued to run when UE performs intersystem change from N1 mode to S1 mode and vice versa.

In another embodiment, the back-off timer received along with reject cause "S-NSSAI not available due to maximum number of UEs reached" is stopped when S-NSSAI-A is received as part of PCO or ePCO in ESM message like ACTIVATE DEFAULT EPS BEARER CONTEXT REQUEST message.

In an embodiment of this disclosure, the method to manage rejected NSSAI of the UE; The UE has first rejected NSSAI in the rejected S-NSSAI list; UE determines that first rejected NSSAI is allowed for the UE when the UE is registered on EPS network; The UE deletes the first rejected NSSSAI from rejected S-NSSAI list and stop the associated back-off timer.

When the UE receive ACTIVATE DEFAULT EPS BEARER CONTEXT REQUEST message provided with S-NSSAI and the PLMN ID in the protocol configuration options IE or extended protocol configuration options IE (see subclause 6.2.2 of 3GPP TS 24.301 [15]), the UE shall remove S-NSSAI from rejected NSSAI for the current PLMN.

When the UE:

1) enters state 5GMM-DEREGISTERED following an unsuccessful registration for 5GMM causes other than #62 "No network slices available" for the current PLMN;
2) successfully registers with a new PLMN;
3) enters state 5GMM-DEREGISTERED following an unsuccessful registration with a new PLMN; or
4) performs inter-system change from N1 mode to S1 mode and the UE successfully completes tracking area update procedure;

and the UE is not registered with the current PLMN over another access, the rejected NSSAI for the current PLMN and the rejected NSSAI for the failed or revoked NSSAA shall be deleted When the UE:

1) deregisters over an access type;

2) successfully registers in a new registration area over an access type;

3) enters state 5GMM-DEREGISTERED or 5GMM-REGISTERED following an unsuccessful registration in a new registration area over an access type; or 4) performs inter-system change from N1 mode to S1 mode and the UE successfully completes tracking area update procedure;

the rejected NSSAI for the current registration area corresponding to the access type shall be deleted;

If the timer T3526 associated with the S-NSSAI(s) was started upon reception of the rejected NSSAI for the maximum number of UEs reached, the UE may remove the S-NSSAI(s) from the rejected NSSAI including S-NSSAI(s) with the rejection cause "S-NSSAI not available due to maximum number of UEs reached", if the timer T3526 associated with the S-NSSAI(s) expires. If one or more S-NSSAIs are removed from the rejected NSSAI for the maximum number of UEs reached, the timer T3526 associated with the removed S-NSSAI(s) shall be stopped, if running. The UE shall not stop the timer T3526 if the UE selects an E-UTRA cell connected to EPC.

When the UE receive ACTIVATE DEFAULT EPS BEARER CONTEXT REQUEST message provided with S-NSSAI and the PLMN ID in the protocol configuration options IE or extended protocol configuration options IE (see subclause 6.2.2 of 3GPP TS 24.301 [15]), the UE shall remove the S-NSSAI from the rejected NSSAI for the current PLMN. When the UE receive ACTIVATE DEFAULT EPS BEARER CONTEXT REQUEST message provided with S-NSSAI and the PLMN ID in the protocol configuration options IE or extended protocol configuration options IE (see subclause 6.2.2 of 3GPP TS 24.301 [15]), the UE may remove the S-NSSAI from the rejected NSSAI for the maximum number of UEs reached for each and every access type, if any, and stop the timer T3526 associated with the S-NSSAI if running.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:

receiving, from a first network related to 5th generation core (5GC), a first message including first rejected network slice selection assistance information (NSSAI) including a first single-network slice selection assistance information (S-NSSAI) with rejection cause information indicating that an S-NSSAI is not available due to a maximum number of UEs reached and storing the first S-NSSAI into second rejected NSSAI for a maximum number of UEs reached based on the rejection cause information;

upon the reception of the first message including the first rejected NSSAI including the first S-NSSAI with the rejection cause information, starting a back-off timer;

determining an intersystem change to a second network related to evolved packet core (EPC), while the back-off timer is running;

receiving, from the second network related to the EPC, an activate default evolved packet service (EPS) bearer context request message;

identifying that the first S-NSSAI and a public land mobile network (PLMN) identifier (ID) are provided in at least one protocol configuration option included in the activate default EPS bearer context request message; and removing the first S-NSSAI from the second rejected NSSAI for the maximum number of UEs reached and stopping the back-off timer, based on the identification.

2. The method of claim 1, wherein the first S-NSSAI is mapped for the second rejected NSSAI based on a reject cause indicating that an S-NSSAI is unavailable, and wherein the reject cause is at least one of an S-NSSAI not available in a current PLMN, an S-NSSAI not available in a current registration area, an S-NSSAI not available due to a failed or revoked network slice-specific authentication and authorization, or an S-NSSAI not available due to a maximum number of UEs reached.

3. The method of claim 1, wherein removing the first S-NSSAI comprises:

deleting the second rejected NSSAI in response to a successful completion of a tracking area update (TAU) procedure with the second network.

4. The method of claim 1, further comprising:

continuing to run the back-off timer in response to an intersystem change from N1 mode to S1 mode of the UE.

5. The method of claim 1, wherein the first message is one of:

a registration accept message, a registration reject message, a deregistration request message, or a configuration update command message.

6. The method of claim 1, wherein the back off timer is received with the first message, and wherein the back off timer is initiated for a predefined time period.

7. A user equipment (UE) in a wireless communication system, the UE comprising:

a transceiver; and at least one processor coupled to the transceiver, the at least one processor configured to:

receive, from a first network related to 5th generation core (5GC), a first message including first rejected network slice selection assistance information (NSSAI) including a first single-network slice selection assistance information (S-NSSAI) with rejection cause information indicating that an S-NSSAI is not available due to a maximum number of UEs reached and storing the first S-NSSAI into second rejected NSSAI for a maximum number of UEs reached based on the rejection cause information, upon the reception of the first message including the first rejected NSSAI including the first S-NSSAI with the rejection cause information, start a back-off timer, determine an intersystem change to a second network related to evolved packet core (EPC), while the back-off timer is running, receive, from the second network related to the EPC, an activate default evolved packet service (EPS) bearer context request message, identify that the first S-NSSAI and a public land mobile network (PLMN) identifier (ID) are provided in at least one protocol configuration option included in the activate default EPS bearer context request message, and remove the first S-NSSAI from the second rejected NSSAI for the maximum number of UEs reached and stop the back-off timer, based on the identification.

8. The UE of claim 7, wherein the first S-NSSAI is mapped for the second rejected NSSAI based on a reject cause indicating that an S-NSSAI is unavailable, and wherein the reject cause is at least one of an S-NSSAI not available in a current PLMN, an S-NSSAI not available in a current registration area, an S-NSSAI not available due to a failed or revoked network slice-specific authentication and authorization, or an S-NSSAI not available due to a maximum number of UEs reached.

9. The UE of claim 7, wherein the at least one processor is further configured to:

delete the second rejected NSSAI in response to a successful completion of a tracking area update (TAU) procedure with the second network.

10. The UE of claim 7, wherein the at least one processor is further configured to:

continue to run the back-off timer in response to an intersystem change from N1 mode to S1 mode of the UE.

11. The UE of claim 7, wherein the first message is one of:

a registration accept message, a registration reject message, a deregistration request message, or a configuration update command message.

12. The UE of claim 7, wherein the back off timer is received with the first message, and wherein the back off timer is initiated for a predefined time period.

* * * * *